United States Patent
Shin

(10) Patent No.: US 12,229,747 B2
(45) Date of Patent: Feb. 18, 2025

(54) SYSTEM AND METHODS FOR A SPATIALLY AWARE AMBIENT MOBILE TRANSACTION PROTOCOL

(71) Applicant: Google LLC, Mountain View, CA (US)

(72) Inventor: Dongeek Shin, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/183,460

(22) Filed: Mar. 14, 2023

(65) Prior Publication Data
US 2024/0311797 A1    Sep. 19, 2024

(51) Int. Cl.
G06Q 20/32    (2012.01)

(52) U.S. Cl.
CPC ..... *G06Q 20/3272* (2013.01); *G06Q 20/3224* (2013.01)

(58) Field of Classification Search
None
See application file for complete search history.

(56) References Cited

U.S. PATENT DOCUMENTS

| | | | |
|---|---|---|---|
| 10,748,133 B1 * | 8/2020 | Mossoba | G10L 25/90 |
| 2020/0329014 A1 | 10/2020 | Chen et al. | |
| 2022/0036337 A1 | 2/2022 | Kawahara et al. | |

FOREIGN PATENT DOCUMENTS

| | | |
|---|---|---|
| KR | 2018/0114886 | 10/2018 |
| WO | WO 2014/134180 | 9/2014 |
| WO | WO 2019/245210 | 12/2019 |

OTHER PUBLICATIONS

International Search Report and Written Opinion for Application No. PCT/US2024/019963, mailed Jun. 28, 2024, 14 pages.

* cited by examiner

Primary Examiner — Scott S Trotter
Assistant Examiner — Amit Patel
(74) Attorney, Agent, or Firm — DORITY & MANNING P.A.

(57) ABSTRACT

The present disclosure provides computer-implemented methods, systems, and devices for enabling frictionless transactions at a merchant location using audio communication. A central hub device receives transaction notification data describing a transaction with a user computing device. The central hub device accesses one or more location determination signals to estimate a location of the user computing device with the merchant location. The central hub device transmits transaction data to the estimated location of the user computing device using audio-based communications, the transaction data including an audio key that, when detected by the user computing device, causes the user computing device to automatically activate an application for providing payment data. The central hub device receiving transaction payment data from the user computing device. The central hub device executes the transaction by transmitting transaction data to a payment system.

18 Claims, 7 Drawing Sheets

SYSTEM AND METHODS FOR A SPATIALLY AWARE AMBIENT MOBILE TRANSACTION PROTOCOL

The present disclosure relates generally to ultrasonic communication schemes. More particularly, the present disclosure relates to performing transactions using ultrasonic communication.

BACKGROUND

As computer technology has improved, the number and type of services that can be provided to users have increased dramatically. The services provided via computer technology include geographic services. Geographic services allow users to determine information about the world around them easily and conveniently. The services provided can include navigation services and service booking services. As geographic data increases in accuracy, other uses can be included in services to improve the experiences of users.

SUMMARY

Aspects and advantages of embodiments of the present disclosure will be set forth in part in the following description, or can be learned from the description, or can be learned through practice of the embodiments.

An example aspect is directed toward a computer-implemented method. The method comprises receiving, by a central hub device comprising one or more processors, transaction notification data describing a transaction with a user computing device. The method further comprises accessing, by the central hub device, one or more location determination signals to estimate a location of the user computing device with the merchant location. The method further comprises transmitting, by the central hub device, transaction data to the estimated location of the user computing device using audio-based communications, the transaction data including an audio key that, when detected by the user computing device, causes the user computing device to automatically activate an application for providing payment data. The method further comprises receiving, by the central hub device, transaction payment data from the user computing device. The method further comprises executing, by the central hub device, by transmitting transaction data to a payment system.

Another example aspect of the present disclosure is directed to a computing system. The computing system comprises one or more processors; and a computer-readable memory. The computer-readable memory stores instructions that, when executed by the one or more processors, cause the system to perform operations comprising receiving transaction notification data describing a transaction with a user computing device. The operations further comprise accessing one or more location determination signals to estimate a location of the user computing device with the merchant location. The operations further comprise transmitting transaction data to the estimated location of the user computing device using audio-based communications, the transaction data including an audio key that, when detected by the user computing device, causes the user computing device to automatically activate an application for providing payment data. The operations further comprise receiving transaction payment data from the user computing device. The operations further comprise executing the transaction by transmitting transaction data to a payment system.

Another example aspect of the present disclosure is directed towards a computer-readable medium storing instructions. The instructions, when executed by one or more computing devices, cause the device to perform operations comprising receiving transaction notification data describing a transaction with a user computing device. The operations further comprise accessing one or more location determination signals to estimate a location of the user computing device with the merchant location. The operations further comprise transmitting transaction data to the estimated location of the user computing device using audio-based communications, the transaction data including an audio key that, when detected by the user computing device, causes the user computing device to automatically activate an application for providing payment data. The operations further comprise receiving transaction payment data from the user computing device. The operations further comprise executing the transaction by transmitting transaction data to a payment system.

Other aspects of the present disclosure are directed to various systems, apparatuses, non-transitory computer-readable media, user interfaces, and electric devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
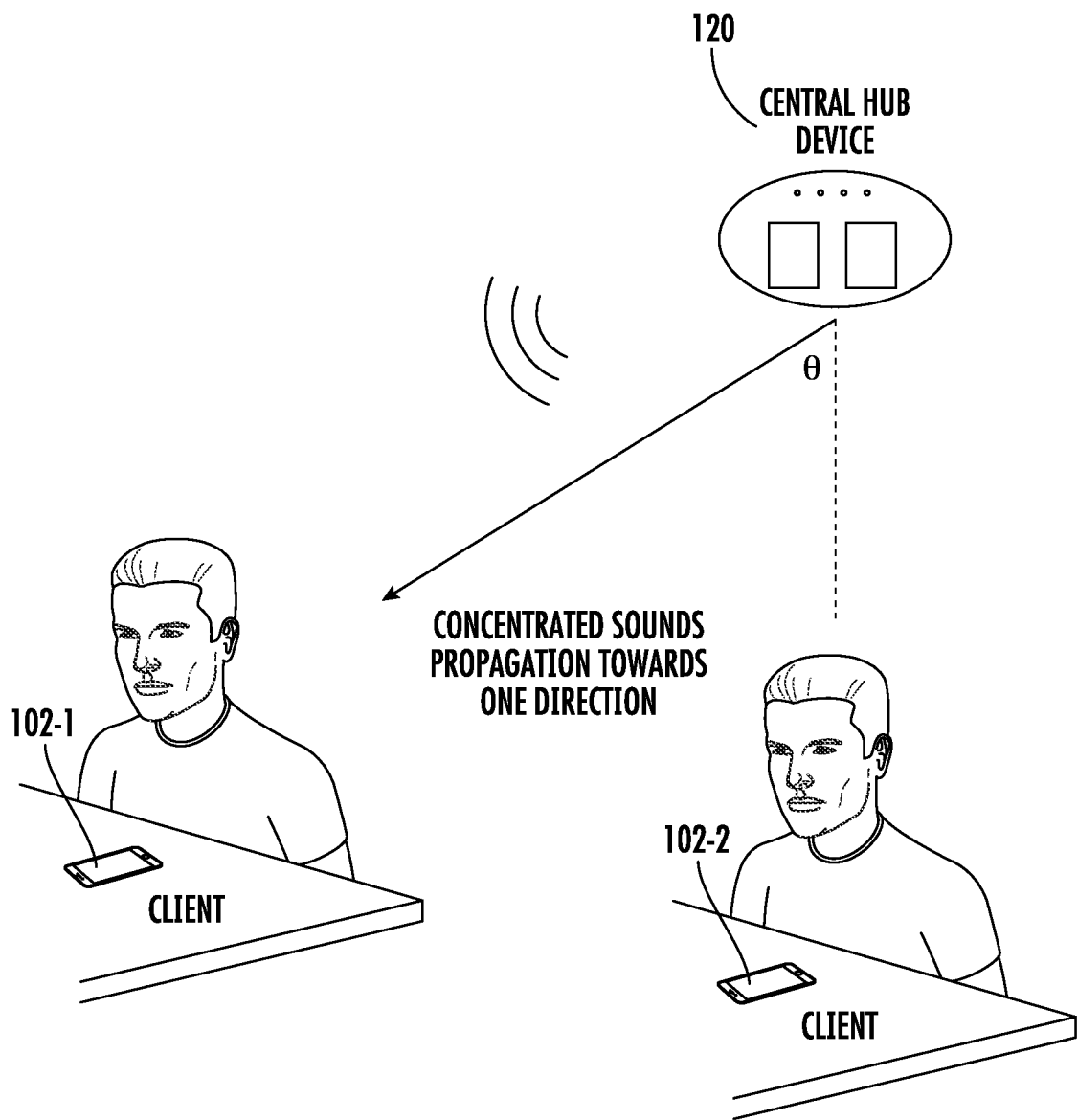
FIG. 1 depicts a system for enabling low friction interactions between computing systems associated with a merchant and user computing devices associated with users according to example embodiments of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure is directed to a system for enabling a spatially aware ambient mobile transaction protocol using a spatiotemporal ultrasonic coding scheme. In general, users may find it difficult to conduct transactions with digital wallets at locations associated with merchants (e.g., restaurants, service locations, and so on) due to uncertainty on the specific process for doing so compared to established methods such as cash or credit cards. As a result, removing friction from the experience of performing transactions via applications enabled with a user computing device can result in increased adoption of mobile based transactions. In addition, merchant locations may determine that the additional cost associated with allowing device payments as the primary form of payment in transactions after establishments may be prohibitively expensive.

To resolve both of these problems, the present technology describes a system in which a merchant can use a relatively inexpensive device (e.g., an off-the-shelf computing hub) in such a way that the transaction and payment are quick and intuitive for the user. In this example, a merchant, such as a restaurant, can use a central hub device to broadcast audio signals to user computing devices. The audio signals can be broadcast at a subsonic wavelength range, so the signals themselves do not disturb the users.

In some examples, the central hub device can be notified that the potential for a transaction is possible. For example, if a user is seated at a location in a restaurant, the staff of the merchant location can record that a new user has begun a transaction and, if appropriate, record the users' location (e.g., if they are seated at a table, the table number can be entered into a database of current customers). In other examples, the central hub device can broadcast registration initiation signals that can be detected by the user computing device, if the user has granted permission for the payment via the user computing device. The user computing device, upon detecting the registration initiation signal, can initiate a registration process by which the user computing device communicates to the central hub device and indicates that the user is present at the location and is potentially going to conduct a transaction. Between the registration process and information from the staff of the merchant location, the central hub device can generate a record of the user computing device and associate it with a particular transaction.

After a period of time, the system can determine that the transaction has reached a point at which payment is needed to complete the transaction. For example, at a restaurant, the central hub device can estimate when the bill is due. When the estimated time arrives, the central hub device can transmit transaction data to the user computing device. The transaction data can include an audio key. The audio key can be a subsonic signal that, when detected by the user computing device, initiates the associated application on the user computing device to perform one or more actions. The audio key enables the user computing device to dedicate a very low amount of power while waiting to detect the key without the additional power needed to run the application.

In some examples, when the notification data is received, the user computing device can generate a notification to the user that one or more steps associated with the transaction are available for them to make. In some examples, the user computing device can generate an audio tone or vibrate as a notification. In other examples, the user computing device will not notify the user and will passively wait for the user to open the associated transaction application. In either case, once the user accesses the transaction application, the user can be enabled to take one or more steps required at that point in the transaction. For example, the steps in which the user takes action can include, but are not limited to: selecting a specific bill associated with their meal, selecting a payment mechanism, approving payment, choosing a tip amount, and so on. Once the user has taken an action, the user computing device can transmit the information (e.g., payment details or other information generated based on the input from a user). In some examples, user interaction can be minimized to complete each transaction. For example, if the user is eating a meal, the transaction can be entirely free of user involvement until authorization to pay is needed. In some examples, the central hub device can complete the next step in the transaction.

In a specific example, a restaurant seeks to provide wireless payments via user computing devices. To do so, the merchant, a restaurant, can purchase a low-cost central computing hub from off the shelf. An application associated with a transaction system can be executed by the central hub device. Users with an associated transaction application installed on their user computing devices (e.g., a smartphone or other portable computing device) can receive communications from and send communications to the central hub device. When such a user arrives at the restaurant with their user computing devices, the central hub device can output a registration initiation signal that includes a key that alerts the user computing devices that payments can be made via the payment system at this merchant location. The user computing devices can register with the central hub device to allow the central hub device to determine that a transaction is likely to begin and also provide information useful to estimating the general location of the user. Similarly, staff associated with the merchant can also record the location of newly arrived customers (e.g., what table the user is seated at). The user can order their food and, when the time to pay the bill arrives, the central hub device can transmit confirmation data or transaction data to the portion of the restaurant at which the user is seated.

The central hub device can steer the audio signal such that it is focused on a particular area of the restaurant. In another example, the communication can include a device identifier that can be used by a respective user computing device to determine whether the particular communication is associated with the respective user computing device or not. In some examples, the communications can be encoded or encrypted such that only the intended user computing device can correctly decipher and respond to the audio communications.

The user computing device can either generate a notification to the user that an interaction is ready or wait until the user has opened the associated transaction application. The user can use the transaction application to authorize the transaction (e.g., a payment) and the user computing system can respond with transaction data to the central hub device. The central hub device can then transmit information to a payment system to complete the transaction. In this case, the user only took one action with their device (approving the payment) using audio-based communication and the rest of the transaction was handled automatically. This ease of use and low cost to the merchants make the adoption of new technologies much easier for users and merchants.

More generally, a payment system can be enabled by the interactions between a central hub device associated with merchants and a user community device associated with a particular user. The central hub device can be any off-the-shelf existing computing hub (e.g., smart speakers, personal computers, and so on) that can execute applications from third-party servers and can communicate via ultrasonic audio communications. In some examples, the central hub device can include a microphone and a speaker to communicate via audio signals. In some examples, the central hub device can include processors that run an application associated with a transaction system. The central hub device can communicate, via a communication network, with the transaction system to receive information as needed and to process transactions, receive payments, and so on.

The user computing device can be any portable computing device associated with the user that includes both the ability to detect audio communications and generate audio communications. For example, a user computing device can include, but is not limited to, a smartphone, a smartwatch, a fitness band, a tablet computer, a laptop computer, a navigation computing device, a wearable computing device, and so on. In some examples, a user computing device can include one or more sensors intended to gather information, with the permission of the user, such as a microphone to gather audio information and/or audio signals from the area around the user computing device.

The central hub device and one or more user computing devices can both have an installed transaction application that allows them to work together to provide payment transactions for users with as few friction points as possible. In some examples, the central hub device can communicate using audio communications. For example, the central hub device can include a speaker that is capable of producing audio signals. Those signals can be controlled such that information can be passed through the audio signals. For example, the frequency, volume, and timing of audio signals (and the lack thereof) can be used to encode information that can be received by a microphone included on another device (e.g., a user computing device). The other device can then interpret the audio communication as long as both devices have a predetermined message protocol for communicating via audio communications.

In some examples, the audio transmissions produced by the hub computing device can be in the subsonic range. For example, subsonic audio communications are communications that are not audible to human ears. In this way, the audio communications between the hub computer device and the user computing devices are not audible to users and thus will not annoy or disturb them.

The communication hub can provide, in addition to data, an audio key that alerts user computing devices that the associated application should be launched or initiated. For example, the associated key can be a specific frequency with a specific frequency pattern. When a user computing device that includes the associated payment application detects the signal, it can move from a passive listening mode into an active mode in which the application has been activated.

In some examples, the data included in the audio transmissions can also include transaction details. The transaction details can include information needed to complete a next step in the transaction. For example, if the next step in the transaction is payment for the transaction, the transaction details can include the total cost of the transaction along with a prompt to the user to approve payment and/or provide payment details. In some examples, the transaction details can include a list of transactions and a prompt for the user to select the transaction associated with the user. In this way, the central hub device does not need to communicate with the user computing device prior to sending the audio transmission.

In some examples, the audio transmissions can also include instructions that cause the user computing device to generate a notification to the user. The user can, using a transaction application installed on the user computing device, provide input to complete one or more steps in the transactions (e.g., provide payment details). The user computing device can then use audio signals to transmit information to the central hub device.

The central hub device can, in response to receiving information from the user computing system, complete one or more transaction steps. For example, if the transaction step is a payment step, the central hub device can provide payment details to a payment processing system.

The systems and methods of the present disclosure provide a number of technical effects and benefits. As one example, the proposed systems can enable a central computing hub at a merchant location to provide low or no friction transactions to users. Generally, digital payments can require several steps that can dissuade users from employing digital wallet payments. The technique disclosed in the present disclosure can automate significant portions of the transaction process to allow low friction transactions for merchants. The current process reduces the overall cost (by allowing merchants to use off-the-shelf technology) and makes such transactions more efficient. Improving the efficiency of such transactions can reduce the amount of storage needed and energy used to conduct transactions between merchants and customers. Reducing the amount of storage needed and energy used reduces the overhead cost of the transactions and improves the user experience. In addition, directed audio communications can increase the security of transactions conducted in this way. The improved power usages and increased security represent an improvement in the functioning of the device itself.

With reference now to the Figures, example embodiments of the present disclosure will be discussed in further detail.

FIG. 1 depicts a system 100 for enabling low friction interactions between computing systems associated with a merchant and user computing devices associated with users according to example embodiments of the present disclosure. In some example embodiments, a merchant location can facilitate audio communications with user computing devices (102-1 and 102-2) by enabling a central hub device 120. Note that while multiple user computing devices are shown in FIG. 1, each having a specific reference number, the reference number 102 can be used to refer to a user computing device. The central hub device 120 can include one or more processors and include memory for storing an application that allows the central hub device 120 to generate communications to be transmitted via audio communications and receive audio communications from a user computing device 102.

In some examples, the central hub device 120 can include one or more speakers that can produce audio in a variety of different frequencies. In some examples, the audio communications produced by the central hub device 120 can be produced in the subsonic range of audio communications. For example, communications can be produced at 12 megahertz. In this way, the audio communications by the central hub device 120 are not audible to users and do not disturb or disrupt their experience.

In some examples, the central hub device 120 can also be associated with one or more microphones. The microphones can receive audio communications from the user computing devices (102-1 to 102-2) that allow the user computing devices and the central hub device 120 to communicate with each other and to pass information needed to conduct a transaction.

In some examples, the central hub device 120 can receive information describing the presence of a user computing device. For example, when a user enters the merchant location, a staff member can enter them into a current customer database that alerts the central hub device 120 that a new customer has entered the space and may conduct a transaction. For example, if the merchant location is a restaurant and a new customer enters and is seated by a member of the restaurant staff, the database of current customers can be updated to include the new customer as well as information about the transaction itself and, if applicant, information about their location (e.g., the location at which they were seated).

In other examples, the central hub device 120 can be notified by the user computing device 102 itself when the user enters the location associated with the merchant. For example, the central hub device 120 can broadcast, periodically, a registration or initiation signal. The user computing device 102, if it includes a transaction application that allows it to communicate with the central computing hub (e.g., a payment application or transaction application associated with the same payment transaction application run by the central computing hub) can recognize the signal and initiate a registration process with the central computing hub.

This process can be performed automatically without user interaction. The user computing device 102 can alert the central hub device 120 of its location and one or more relevant details about the user (with the previous permission of the user) to enable quicker and more seamless transactions.

In some examples, once the central hub device 120 has registered the presence of the user computing device 102 and been made aware of a potential transaction, the central hub device 120 can wait a specific amount of time before taking additional action. For example, if a user enters the restaurant and begins a meal, the central community hub can wait until payment for the meal is required (either based on an estimated amount of time to conduct a meal or based on a notification from the staff that the payment phase of the transaction has begun) before taking additional action.

The central hub device 120, once it has determined that payment is necessary for the completion of the transaction, can transmit transaction data to the user computing device. In some examples, the transaction data can include an initial audio key signal. The initial key signal can be a predetermined key known to both the user computing device 102 and the central hub device 120 to initiate or alert the user computing device 102 that the payment transaction is ready.

In some examples, the central hub device 120 can transmit this data by steering or directing the audio signal towards the estimated location of the user computing device 102. As noted above, the central hub device 120 can estimate the location of the user computing device 102 based on one or more factors, the factors including, but not limited to: the information provided by staff associated with the merchant, the distance calculated based on the amount of time needed for the transmission of information between the two devices, and, if more than one microphone is available, a triangulation of the specific direction of the user computing device 102 based on the relative times at which the signals from the user computing device are received by the various microphones.

In some examples, directing the audio signals in a specific direction can enable the central hub device 120 to transmit signals farther in a particular direction than would be possible if the signal was transmitted equally in all directions. In addition, directing the audio signals in a specific direction can enable only the user computing devices 102 and devices near it to receive this signal, reducing the chance of unintended parties receiving any information.

In some examples, the user computing device 102 can, in response to receiving the audio key, generate a notification on the user computing device 102 to alert the user that a next step in the transaction is available to be performed (e.g., the payment step). In other examples, no notification is generated but the transaction information is made available to the user in the application associated with the transaction should the user choose this specific method to conduct the transaction. In this way, the transaction is as low friction as possible.

In some examples, the user can complete the transaction using the transaction application on their user computing device 102. In some examples, the user completes the transaction by selecting their specific transaction from a list of possible transactions (e.g., distinguishing their order from the orders of nearby tables) or, if the user computing device has previously communicated with the central hub device 120 to register, merely approving payment for a transaction specific to their user computing device 102.

Once the user has approved the payment of the transaction, the central hub device 120 can transmit transaction completion information to the central hub device 120 via the audio communication protocol. The transaction completion information can include a payment method and or payment identifier. In other examples, the payment completion information can include a user account identifier to inform the central hub device 120 which specific user account is to be associated with the current transaction.

Figure 2:
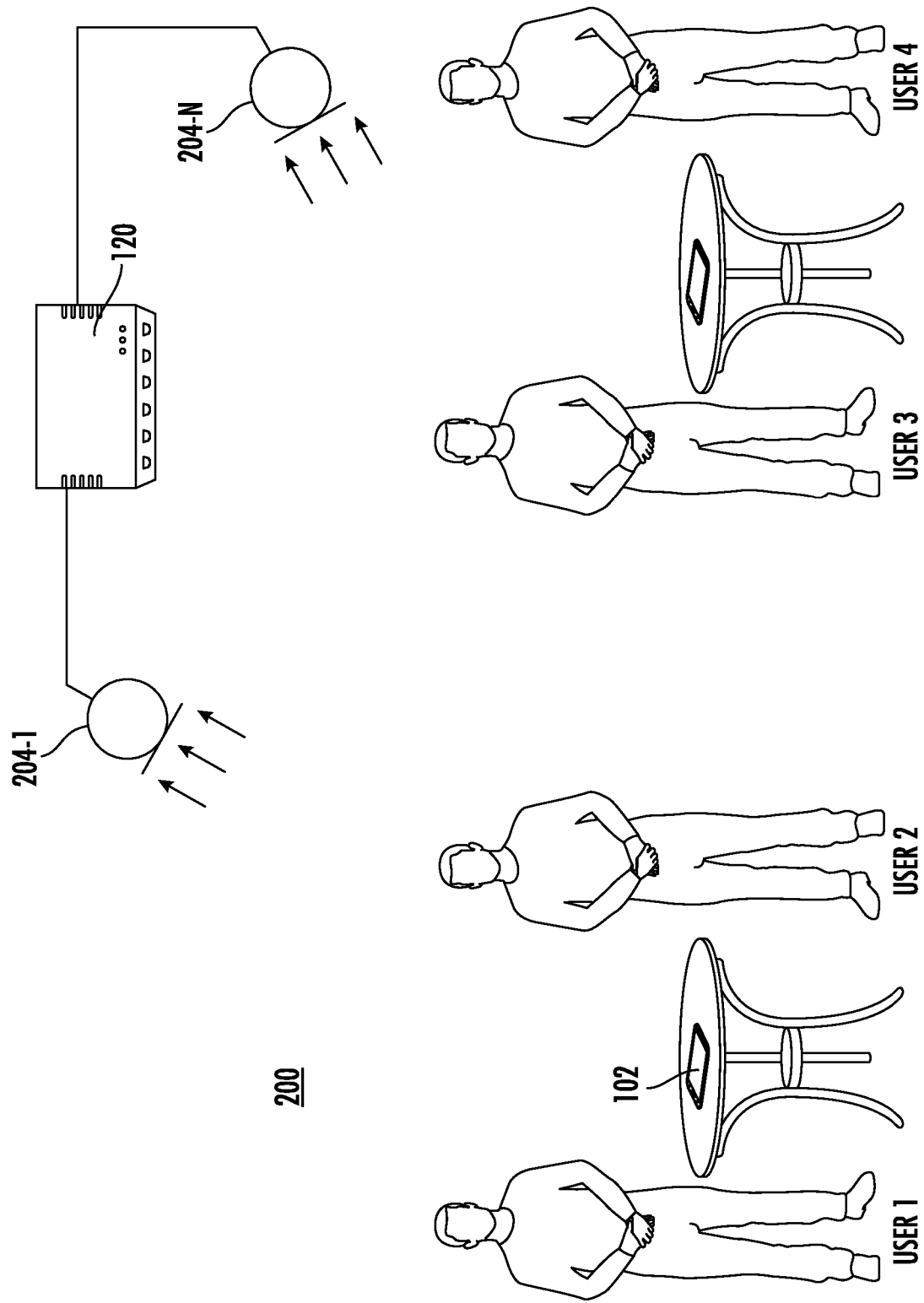
FIG. 2 depicts a system for enabling low friction interactions between computing systems associated with the merchant and user computing devices associated with users according to example embodiments of the present disclosure.

FIG. 2 depicts a system 200 for enabling low friction interactions between computing systems associated with the merchant and user computing devices 102 associated with users according to example embodiments of the present disclosure. A merchant location can include more than one user computing device, each associated with a different user.

The central hub device 120 can determine a direction for a specific user computing device 102 or customer currently in the location associated with the merchant. In some examples, the staff of the merchant location can keep an up-to-date list of the current customers as well as information about the location of the user within the merchant location, with the permission of the user. For example, some merchant locations are restaurants that seat customers in specific locations or tables for the duration of their stay at the merchant location. In this example, the table placement of users can be recorded in a database and made available to the central hub device 120. The central hub device 120 can use this table placement to determine a direction and distance of a respective user in the merchant location.

In some examples, the central hub device 120 has more than one audio sensor (e.g., microphones 204-1 to 204-N). The multiple audio sensors (204-1 to 204-N) can be used to triangulate the location of the user computing device 102 with the location of the merchant. The user computing device 102 can then be targeted by directed audience signals generated by the central hub device 120. For example, the central hub device 120 can have a coordinate system that marks a certain direction as zero degrees and every other direction as an offset from that direction.

In some examples, once the estimated direction of the user computing device 102 is determined, the central hub device 120 can generate an audio signal and direct the audio signal such that it is focused toward the location where the user computing device 102 is estimated to be. In this way, audio signals intended for a particular user can be transmitted to the location of that user or user computing device 102 with additional power.

Figure 3:
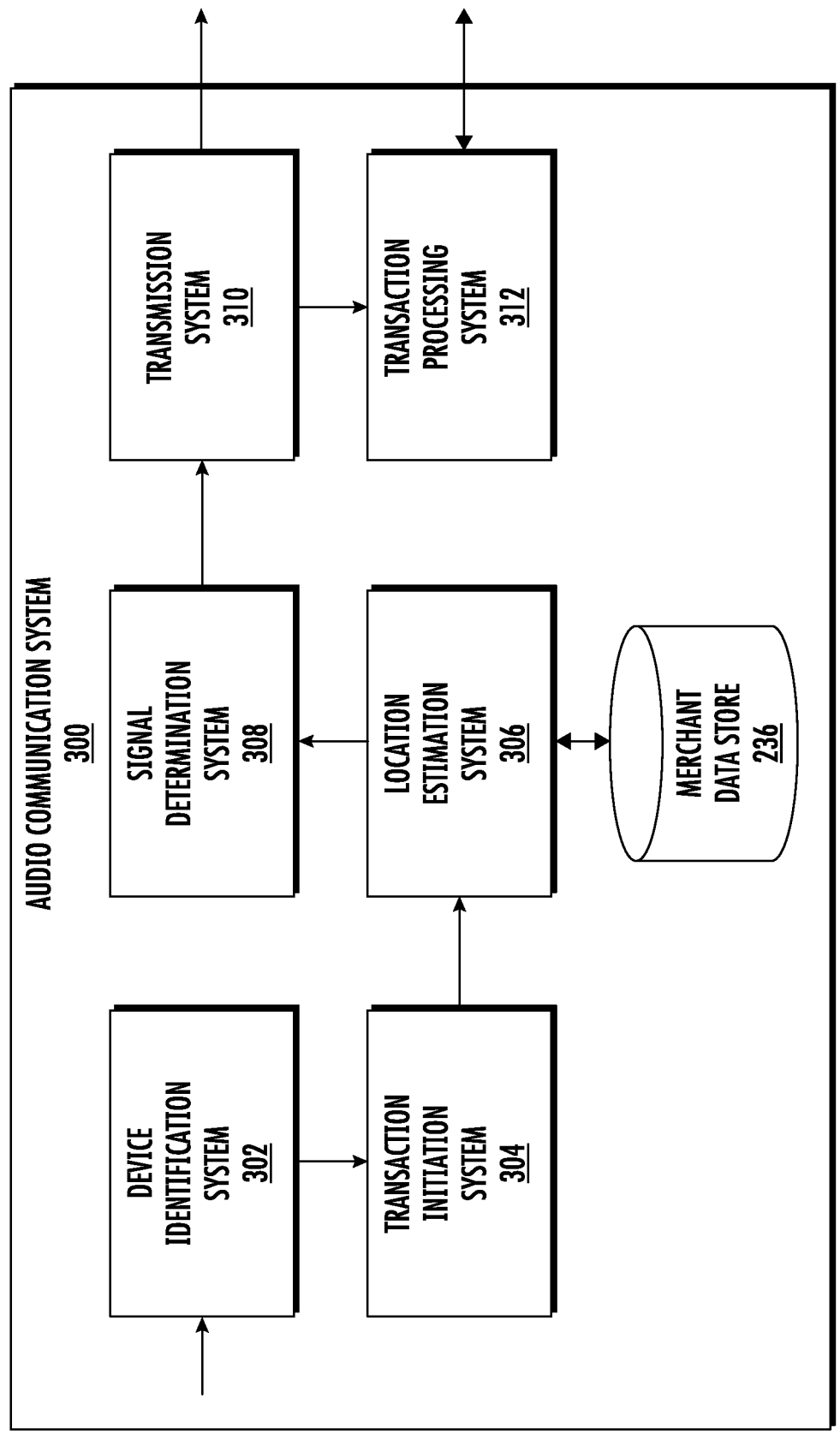
FIG. 3 is an example audio communication system associated with a central computing hub according to example embodiments of the present disclosure.

FIG. 3 is an example audio communication system 300 associated with a central computing hub according to example embodiments of the present disclosure. In this example, the audio communication system 300 can be integrated into a central computing hub that performs communications and transactions with user computing devices within a particular location of a merchant. The audio communication system 300 can be associated with a computing system including one or more processors, memory for storing instructions, one or more audio sensors (e.g., microphones), and one or more devices capable of producing audio signal communications such as speakers.

The audio communications system 300 includes a device registration system 302, a transaction initiation system 304, a location estimation system 306, a signal generation system 308, a transmission system 310, and a transaction processing system 312. The audio communication system 300 can also include a merchant data store 236.

In some examples, the device registration system 302 can operate to communicate with one or more user computing devices 102 within the transmission range of the audio communication system 300. In some examples, the device registration system 302 can identify user computing devices 102 when the device enters the merchant location. To do so, the audio communications system 300 can continuously or repeatedly broadcast a registration initiation code. The user computing device 102 can passively sense audio communications to identify a registration initiation code. Other audio signals (such as general noise or words spoken by users) can be discarded without analysis as such analysis would use a significant amount of power and processing time. When the registration initiation code is detected, the associated transaction application can be initiated on the user computing device 102. When the transaction application is initiated, it can generate one or more audio communications that can enable the audio communication system 300 to initiate a registration or handshaking process with the user computing device 102.

In some examples, the device registration system 302 can, during the registration process, generate an identifier for the user computing device 102 to use while in communication with the audio communication system 300. The audio communication system 300 can use the identifier to generate communications that are targeted at a specific user computing device 102. In other examples, the device registration system 302 can identify the user computing device 102 at a later point in the transaction. For example, when payment is necessary, the audio communication system 300 can at that point generate transaction data that includes an audio key. Thus, the user computing device 102 can receive the audio key and in response, respond to audio communication system 300.

In some examples, the transaction initiation system 304 can determine when to communicate transaction details to the user computing device 102. In some examples, the transaction initiation system 304 can estimate the amount of time between the user associated with the user computing device entering the location or initiating a transaction (e.g., ordering food from a restaurant) and the time at which further interaction with the user will be needed to continue with the transaction (e.g., payment will be required for the transaction). Based on this estimated time, the transaction initiation system 304 can determine a specific time at which the next transaction step (e.g., a payment step) should be initiated.

When the transaction initiation system 304 determines that transaction data should be transmitted to the user computing device 102, the location estimation system 306 can be accessed to determine an estimated location of the user. The location estimation system 306 can access data in the merchant data store 236 to determine whether the user computing device is associated with a particular location. For example, a user can be seated at a particular table restaurant and that information can be stored in the merchant data store 236 where data about current customers is stored. For example, the merchant data store can receive updated information describing the location of each current user in the location of the merchant as well as any information about the user's specific transaction.

The location estimation system 306 can also use triangulation to estimate the location of the user computing device 102. For example, if the user computing device 102 has previously been communicating with the audio communication system 300, for example during a registration process, the audio communication system 300 can use information about the timing of signals from the user computing device 102 (e.g., the amount of time four signals to travel between the user computing device and the audio communication system 300) to determine a distance from the audio communication system 300. Similarly, if more than one microphone or other audio sensor is present, the difference between the time at which each microphone or other audio sensor receives the audio signals can be used to estimate or triangulate the direction of the user computing device 102.

Once the location estimation system 306 has estimated a location of the user computing device, the information can be passed to the signal generation system 308. The signal generation system 308 can determine the specific information to be transmitted to the user computing device 102 and the estimated location of the user computing device for us in focusing the transmitted signal on the area associated with the user computing device. For example, the details of the transaction can be included in the transaction data transmitted to the user computing device such that the transmitted data includes the specific information associated with the user's transaction. For example, the specific food ordered by one or more users at a restaurant can be provided to the signal generation system 308 from the merchant data store 236 to determine the amount that the transaction will cost. In some examples, if the user computing device 102 has previously registered with the audio communication system 300 information about the user account associated with the user computing device 102 can also be provided to the signal generation system 308.

Once the specific information to be transmitted to the user computing device 102 is determined, the signal generation system 308 can provide that information to the transmission system 310. The transmission system 310 can generate an audio signal that includes the determined information and can also include an audio key. The audio key, as noted above, is a predetermined signal that, when detected by the user computing device 102, will cause a transaction application on the user computing device 102 to change from a passive listening mode into an active mode in which the rest of the data can be received and presented to the user. For example, the information transmitted by the transmission system 310 can include instructions to cause the user computing device 102 to present a notification to the user such that the user is aware that their transaction payment is prepared to be completed.

In some examples, the transmission system 310 can include a specific device identifier associated with a particular user computing device 102. The device identifier can be a value that is only associated with a single user computing device at a given point. This identifier can be used to ensure that only the intended target user computing device 102 will receive the audio communication signal. In some examples, this identifier can be determined during a registration process when the user computing device 102 enters the merchant location. In other examples, the user computing device can be registered with the transaction application provider and that identifier can be used in all subsequent interactions with merchants that use the transaction application to provide frictionless transactions.

The audio signal can include transaction data. The transaction data can include instructions that cause the user computing device 102 to generate a notification (an audio, visual, or haptic prompt). In some examples, the transaction data generated by the transmission system 310 does not result in a notification at the user computing device. Instead, that information is recorded by the transaction application on the user computing device 102 such that if the user wishes to pay via the transaction application the transaction information is already preloaded when the user opens the application. Once the transaction data has been transmitted by the transmission system 310, a transaction processing system 312 awaits the response from the user computing device 102. The response from the user computing device 102 can include information indicating that the user has approved the transaction and may include payment details. In some examples, the payment details can be previously determined during the registration process or accessed by the audio communication system 300 during a user registration process. In other examples, the payment details can be associated with a user account associated with the transaction facilitation system and provided to the audio communication system 300 via a computing network. The transaction processing system 312 can transmit payment account details to a payment processing system to complete the transaction (e.g., transfer of value between the user and the merchant).

Figure 4:
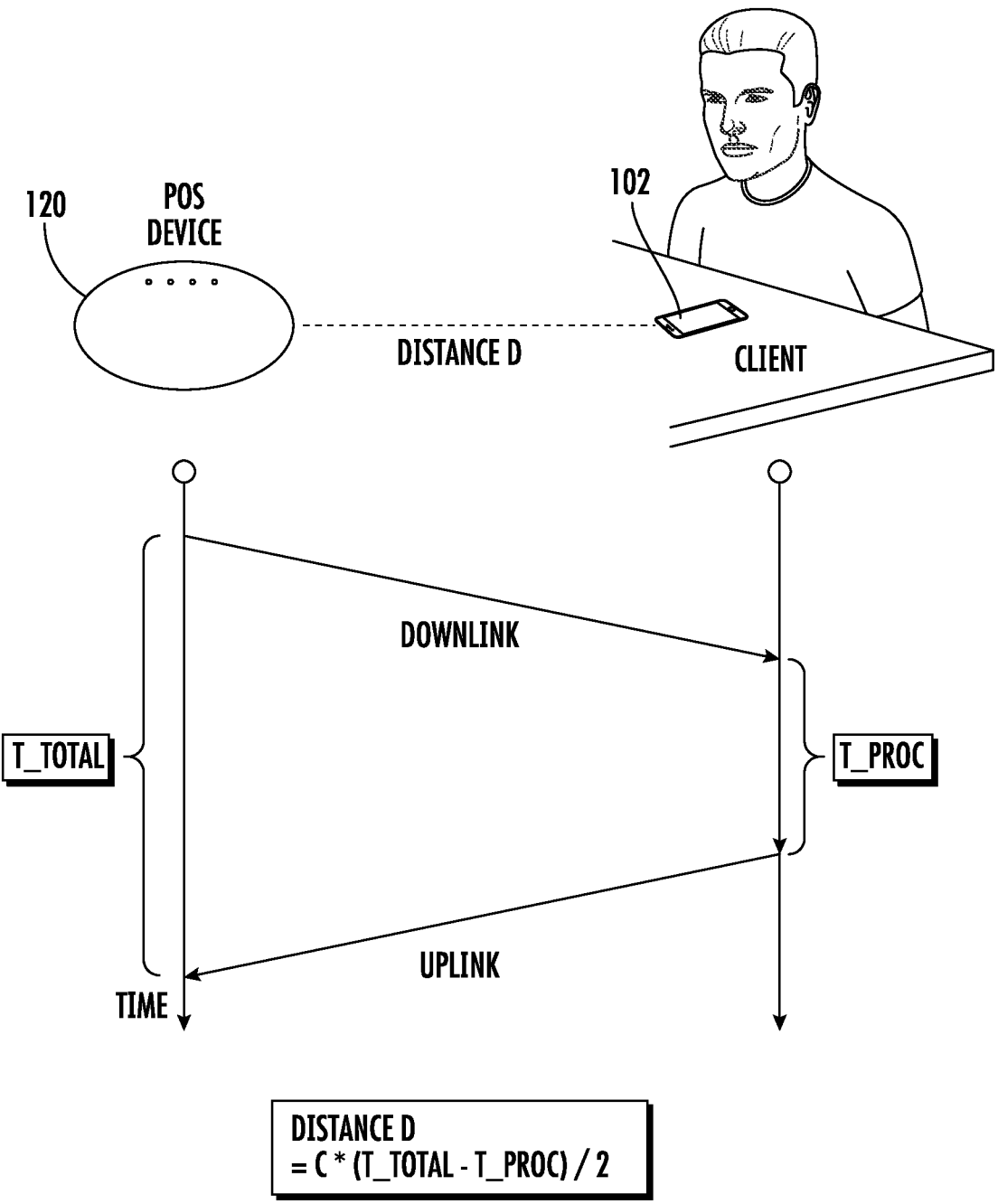
FIG. 4 depicts an example process for determining a distance between a central hub device associated with the merchant and a user computing device.

FIG. 4 depicts an example process for determining a distance between a central hub device 120 associated with the merchant and a user computing device. For example, the central hub device 120 can transmit data to the user computing device 102. The time between when the data is sent via the downlink and when the response is received can be referred to as the total time. The total time can include the time to transmit data to the user computing device, the time it takes the user computing device to process the data, and the time it takes for the user computing device to communicate back to the central computing hub. Thus, the total time can be referred to as $T_{total}$. The total distance between the central processing hub and the user computing device can be estimated based on the below formula.

$$\text{Distance to Client device} = c\left(T_{total}/T_{processing}\right)/2$$

In this formula, c is the speed of light and $T_{processing}$ is the time spent processing the information at the user computing device 102.

In this example, the time for processing may be estimated by the central hub device 120 or maybe provided by the user computing device. If that time is estimated, that estimated time can be completed with more accuracy as additional communications are performed such that the estimated distance of the user computing device can be improved over time as more communications are completed and the processing time at the user computing device 102 is more accurately estimated. In some examples, the user computing device can provide information about the amount of time used to process the data for us in calculating distances.

Figure 5:
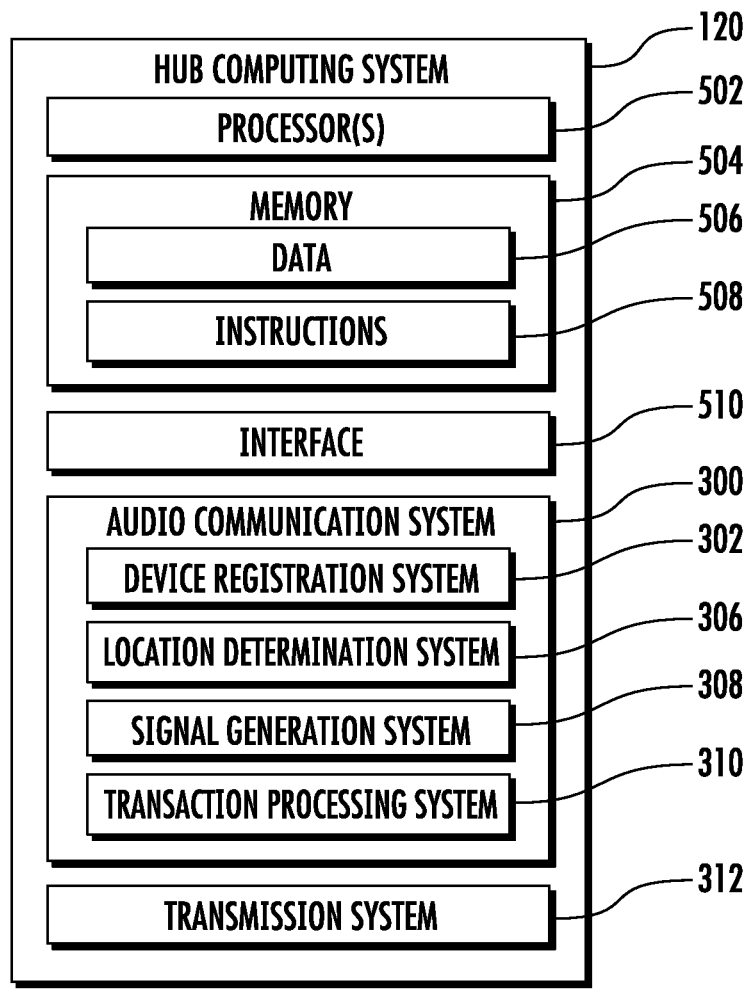
FIG. 5 depicts an example central hub device in accordance with example embodiments of the present disclosure.

FIG. 5 depicts an example central hub device 120 in accordance with example embodiments of the present disclosure. In some example embodiments, the central hub device 400 can be any suitable device, including, but not limited to, a smart speaker computing system, a personal computer, or any other computing system that is configured such that it can communicate with user computing devices via audio communication. The central hub device 500 can include one or more processor(s) 502, memory 504, an interface 510, an audio communication system 300, and a transmission system 310.

The one or more processor(s) 502 can be any suitable processing device, such as a microprocessor, microcontroller, integrated circuit, or other suitable processing device. The memory 504 can include any suitable computing system or media, including, but not limited to, non-transitory computer-readable media, RAM, ROM, hard drives, flash drives, or other memory devices. The memory 504 can store information accessible by the one or more processor(s) 502, including instructions 108 that can be executed by the one or more processor(s) 502. The instructions can be any set of instructions that when executed by the one or more processor(s) 502, cause the one or more processor(s) 502 to provide the desired functionality.

In particular, in some devices, memory 504 can store instructions for implementing the interface 510, the audio communication system 300, and the transmission system 310. The central hub device 120 can implement the interface 510, the audio communication system 300, and the transmission system 310 to execute aspects of the present disclosure, including using audio communication to facilitate low-friction transactions for users in locations associated with merchants.

It will be appreciated that the terms "system" or "engine" can refer to specialized hardware, computer logic that executes on a more general processor, or some combination thereof. Thus, a system or engine can be implemented in hardware, application-specific circuits, firmware, and/or software controlling a general-purpose processor. In one embodiment, the systems can be implemented as program code files stored on a storage device, loaded into memory and executed by a processor or can be provided from computer program products, for example computer executable instructions, that are stored in a tangible computer-readable storage medium such as RAM, hard disk, or optical or magnetic media.

Memory 504 can also include instructions 508 and data 506, such as merchant location data available to the audio communication system 300 (e.g., data representing one or more current transactions being performed, the data associated with those transactions, and the location of users within the merchant location) geographic area including one or more noise sources, noise inhibiting features, and so on received from a navigation system), that can be retrieved, manipulated, created, or stored by the one or more processor(s) 502. In some example embodiments, such data can be transmitted to the user computing system as needed.

As noted above, the central hub device 500 includes the interface 510, the audio communication system 300, and the transmission system 310. The interface 510 can receive data from remote computing systems, such as user computing devices 102 within the audio communication range of the central hub device 120. In some examples, the interface 510 can receive audio communications via one or more audio sensors (e.g., one or more microphones). The interface 510 can periodically broadcast a signal that causes user computing devices 102 with the appropriate application to initiate the application or begin a registration process.

In some examples, when the interface 510 receives a registration communication from a user computing device 102, that information can be provided to the audio communication system 300. In some examples, the interface 510 can facilitate information being received from a member of the staff of a merchant location. For example, the interface 510 can be associated with an input device such as a keyboard or mouse allowing a merchant staff member to input information about the current customers of the merchant location as well as information about the transactions they may be conducting and the location at which the users are positioned. The information input via the interface 510 can be provided to the audio communication system 300.

In some examples, the audio communication system 300 can include the device registration system 302, a location estimation system 306, a signal generation system 308, a transmission system 310, and the transaction processing system 312. The audio communication system 300 can use these systems to work together to provide transaction facilitation services to users via audio communication using their user computing devices. The transaction facilitation services can enable relatively frictionless transactions.

In some examples, the device registration system 302 can receive registration communications from one or more user computing devices 102. In some examples, registration communications can include information transmitted by the user computing device 102 as part of the handshake or registration process with the central hub device 120. For example, the user computing device 102 can transmit data including an identifier for the user computing device 102 and/or an identifier for the specific user account associated with the user computing device 102. In some examples, the device registration system 302 can use the identity of the user computing device 102 or the identifier of the user account to access information about a user from a server system associated with a transaction application on both the user computing device 102 and the central hub device 120. For example, the central hub device 120 can be associated with a particular server system that provides transaction capability to the central hub device. This server computing system can allow users to register accounts including information associated with the user and user preferences for payment transactions.

For example, the users can provide user account information that can be used to perform transactions. This user account information can be accessed by the device registration system 302 upon receipt of communications from the user computing device. In some examples, the device registration process is performed when the user enters the merchant space or merchant location in response to periodic transmission of an identification or initiation code from the central hub device 120. In other examples, the registration process can be performed at the end of the transaction right when payment is needed. In either case, the user computing device 102 can provide identification information to the central hub device 120.

In some examples, the audio communication system 300 can employ a location estimation system 306. In some examples, the location estimation system 306 can generate an estimated location for the user computing device 102 within the location of the merchant. In some examples, this estimation can be based on information provided by the staff of the merchant location. For example, if the users are sat at a particular table that table can be entered into a merchant location database that is available to the location estimation system 306.

In other examples, the location of the user can be estimated based on signals detected by the one or more sensors associated with the central hub device 120. For example, if the user computing device 102 and the central hub device 120 are communicating as part of a registration process, the location estimation system 306 can estimate the distance from the hub to the user computing device based on the amount of time needed to perform communications between the two devices. For example, once the message is sent to the user computing device 102, the location estimation system 306 can track the time needed for a response to be returned by the user computing device 102. The location estimation system 306 can estimate the amount of processing time at the user computing device 102, remove that from the total time, and then divide the rest of the time in half to estimate the one-way distance between the user computing device 102 and the central hub device 120. In some examples, as additional communications are made the estimated distance can be improved as more communications can be used to more accurately estimate the processing time at the user computing device 102.

In some examples, the angle at which the user computing device is located can be estimated by triangulating the distance between when the signal is received at one or more audio sensors. For example, if the signal is received at the first audio sensor three milliseconds faster than a second audio sensor, this information can be used to triangulate the direction in which the user computing device 102 is located relative to the central hub device 120. This angle can be combined with the estimated distance to generate an approximate location of the user computing device 102.

Once the location of the user computing device 102 is estimated, the signal generation system 308 can generate a specific signal to be sent to the user computing device 102. For example, during the registration process, the particular signal generated can be associated with providing registration data to the user computing device 102. Once the registration process is completed, the signal can include information associated with a particular step in a particular transaction. For example, when the signal generation system 308 can estimate a time at which information is needed by the user computing device to complete the transaction. For example, at a restaurant, the amount of time from the time when a user is initially seated at the restaurant until the payment is due can be estimated by the signal generation system 308.

When the estimated time has elapsed, the signal generation system 308 can access transaction information from the merchant computing database. For example, the transaction data can include information such as the services provided, the payment required, the objects to be delivered, and so on. Using this information, the signal generation system 308 can generate a transaction request including, for example, the amount of value required to complete the transaction. These transaction requests can be provided to the transmission system 310.

The transmission system 310 can, using information provided by the signal generation system 308, generate an audio communication signal. The audio communication can include information about a transaction to be processed. In addition, the audio communication system 300 can include an audio key. The audio key can be a signal that is provided at the beginning of the transmission. This audio key signal can be a predetermined audio signal that is known to all user computing devices 102 that include the specific application with which this transaction is being processed. The user computing devices 102 that have the appropriate transaction application can passively be listening for the audio key signal. The audio key signal can be subsonic such that users are not able to discern the signal being transmitted.

When the user computing device 102 receives the audio key signal, the user computing device 102 can initiate the transaction application or transition the transaction application from a dormant mode into an active mode. In this way, the transaction application can consume very little power while not in use.

In some examples, in response to receiving the audio key and or the transaction data, the user computing device 102 can provide a notification sound to the user. This notification sound notifies the user that a transaction is ready to be completed. In other examples, the transaction is included in the transaction application for use should the user choose to pay via the transaction application, but no notification is generated such that the transaction application provides as little interruption as possible.

In some examples, if the user computing device 102 has already been registered with the audio communication system 300, the transaction information can include an identifier of the user computing device 102. The identifier can be used to ensure that the appropriate user computing device 102 is able to receive the appropriate transaction information included in the audio communication. If no registration has previously been performed, the transmission system 240 can target the communication to the specific area of the merchant location at which the user computing device 102 is located. Only devices in this general area will receive the transaction information and a user can select their specific transaction information from a list of potential transaction information.

If a user selects to complete the transaction process through the transaction application, the user computing device 102 can transmit the completion data back to the central hub device. The interface 510 can receive the completion data and provide it to a transaction processing system. The transaction processing system can use the transaction completion data provided by the user computing device to transmit transaction data to a remote server system capable of processing the transaction. Once the transaction is completed, confirmation data can be transmitted back to the user computing device 102.

Figure 6:
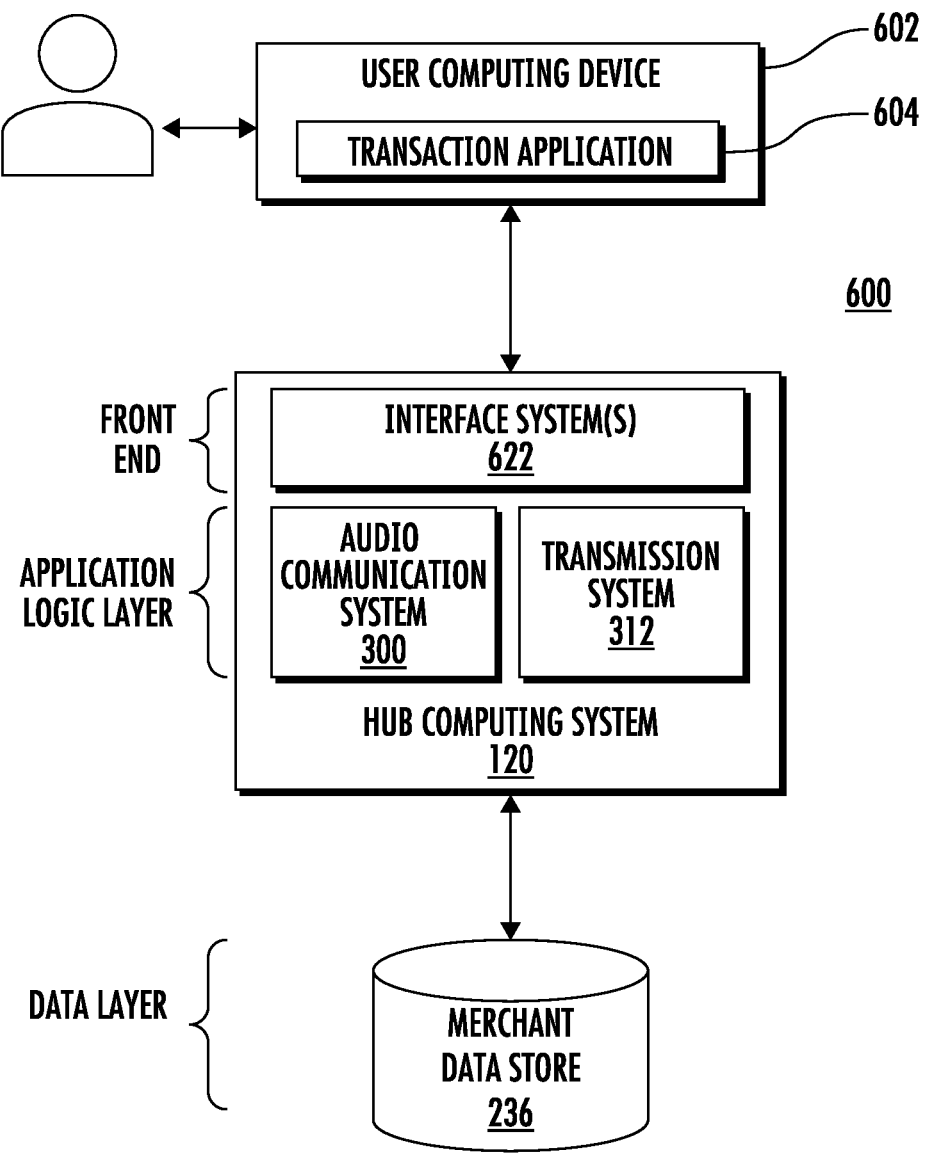
FIG. 6 depicts an example communication system environment according to example embodiments of the present disclosure.

FIG. 6 depicts an example communication system environment 600 according to example embodiments of the present disclosure. The communication system environment 600 includes one or more user computing devices 602 and a central hub device 120. The central hub device 120 and the user computing device can communicate via audio communication protocols.

A user computing device 602 can include, but is not limited to, smartphones, smartwatches, fitness bands, navigation computing devices, laptop computing devices, and embedded computing devices (computing devices integrated into other objects such as clothing, vehicles, or other objects). In some examples, a user computing device 602 can include one or more sensors intended to gather information with the permission of the user associated with the user computing device 602.

In some examples, the user computing device 602 can include one or more application(s) 604 such as search applications, communication applications, navigation applications, productivity applications, game applications, word processing applications, or any other applications. The application(s) can include a web browser. The user computing device 602 can use a web browser (or other application) to send and receive requests to and from the central hub device 120. The application(s) can include a transaction application 604 that enables the user to perform transactions with a particular merchant, group of merchants, or with any merchant registered with a particular transaction system. The application 604 can include the ability to register with the central hub device 120 upon arrival at a location associated with the merchant, receive transaction details from the central hub device 120, and transmit transaction acceptance information to the central hub device 120.

As shown in FIG. 6, the central hub device 120 can generally be based on a three-tiered architecture, consisting of a front-end layer, application logic layer, and data layer. As is understood by skilled artisans in the relevant computer arts, each component shown in FIG. 6 can represent a set of executable software instructions and the corresponding hardware (e.g., memory and processor) for executing the instructions. To avoid unnecessary detail, various components and engines that are not germane to conveying an understanding of the various examples have been omitted from FIG. 6. However, a skilled artisan will readily recognize that various additional components, systems, and applications may be used with a central hub device 120, such as that illustrated in FIG. 6, to facilitate additional functionality that is not specifically described herein. Furthermore, the various components depicted in FIG. 6 may reside on a single server computer or may be distributed across several server computers in various arrangements. Moreover, although the central hub device 120 is depicted in FIG. 6 as having a three-tiered architecture, the various example embodiments are by no means limited to this architecture.

As shown in FIG. 6, the front end can consist of an interface system(s) 522, which receives communications from one or more user computing devices 602 and communicates appropriate responses to the user computing devices 602. For example, the interface system(s) 522 may receive requests via an audio communication protocol and respond using the same audio communication protocol.

As shown in FIG. 6, the data layer can include a merchant data store 236. The merchant data store 236 can store a variety of data associated with the merchant. For example, the merchant data store 236 can include data associated with a specific merchant location. For example, the merchant data can include a list of current transactions occurring at the merchant location, information about each current transaction, information about the location of each user (e.g., seating location in a restaurant), and so on. In some examples, user account information can be retrieved from a server system associated with the transaction application and stored in the merchant data store 236.

The application logic layer can include an audio communication system 300 and a transmission system 310. The audio communication system 300 can produce audio communications in the subsonic range of audio communications. For example, communications can be produced at 12 megahertz. In this way, the audio communications by the central hub device 120 are not audible to users and do not disturb them or disrupt their experience. In some examples, the audio communication system 300 can register the presence of the user computing device 602 in the location of the merchant. This registration can be based on communications received from the user computing device (e.g., when the user with the user computing device 102 enters the merchant location) or based on information provided by a staff member of the merchant (e.g., a user is seated at a restaurant and the server records that fact in a database accessible to the audio communication system 300).

The audio communication system 300 can determine that one or more steps should be taken to complete the transaction (e.g., payment is required to complete the transaction). Once it has determined that payment (or another step) is necessary for the completion of the transaction, the transmission system 310 can transmit transaction data to the user computing device 602. In some examples, the transaction data can include an initial audio key signal. The initial key signal can be a predetermined key known to both the user computing device 602 and the central hub device 120 to initiate or alert the user computing device 602 that the payment transaction is ready.

In some examples, the central hub device 120 can transmit the data through an audio signal using the transmission system 310 in such a way that it is directed towards the estimated location of the user computing device 602. As noted above, the central hub device 120 can estimate the location of the user computing device 602 based on one or more factors, the factors including, information provided by staff associated with the merchant, distance calculated based on the amount of time needed for the transmission of information between the two devices, and, if more than one audio sensor is available, a triangulation of the specific location of the user computing device 602 based on the relative times at which the signals from the user computing device 602 are received by the audio sensors.

The user computing device 602 can generate a notification on the user computing device to alert the user that payment is available. In other examples, the user can, using an application on the user computing device 602, complete the transaction. In some examples, the user completes the transaction by selecting their specific transaction from a list of possible transactions (e.g., distinguishing their order from the orders of nearby tables) or, if the user computing device 602 has previously communicated with the central computing hub to register, merely approving payment for a transaction specific to their user computing device 602.

Once the user has approved the payment of the transaction, the user computing device can transmit transaction completion information to the central hub device 120 via the audio communication protocol. The transaction completion information can include a payment method and or payment identifier. In other examples, the payment completion information can include a user account identifier to inform the hub which user account to be using when performing payment for the transaction.

Figure 7:
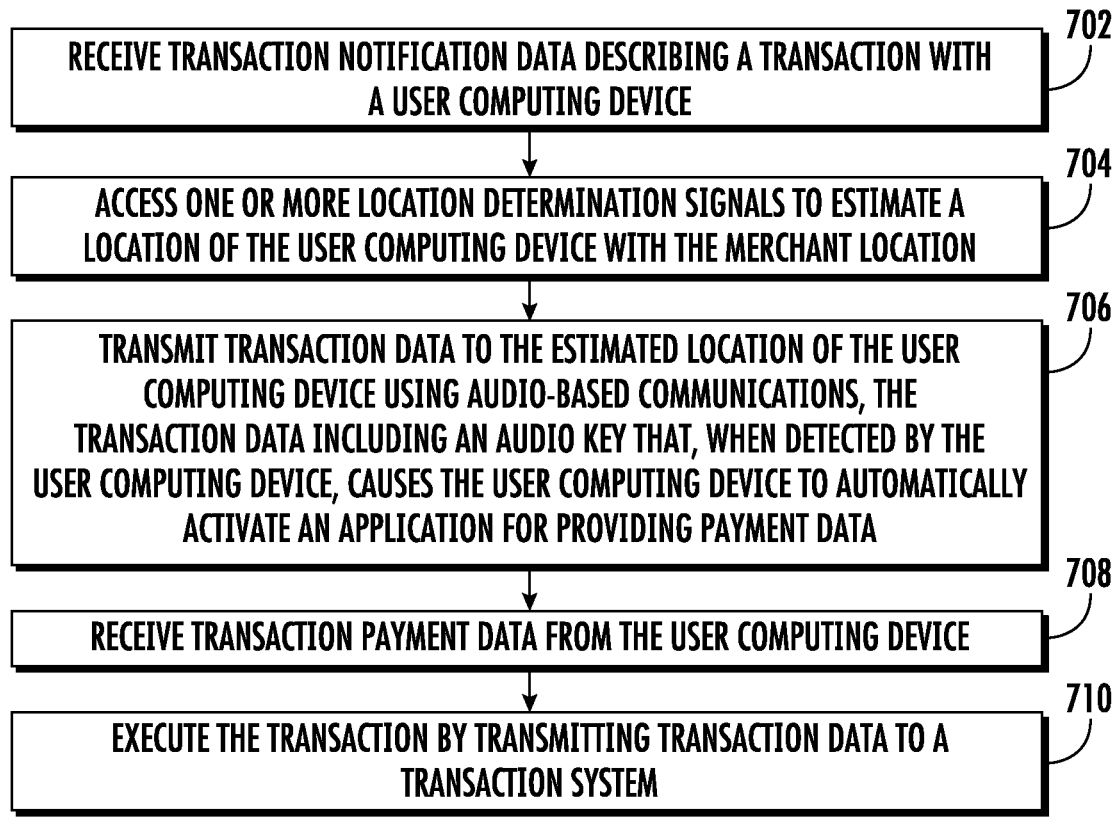
FIG. 7 depicts an example flow diagram for a method of estimating the noise level of a location using geographic map data according to example embodiments of the present disclosure.

FIG. 7 depicts an example flow diagram for a method of estimating the noise level of a location using geographic map data according to example embodiments of the present disclosure. One or more portion(s) of the method can be implemented by one or more computing devices such as, for example, the computing devices described herein. Moreover, one or more portion(s) of the method can be implemented as an algorithm on the hardware components of the device(s) described herein. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. The method can be implemented by one or more computing devices, such as one or more of the computing devices depicted in FIGS. 3, 5, and 6.

A central hub device (e.g., central hub device 120 in FIG. 1) can include one or more processors, memory, and other components that, together, enable the computing device to enable frictionless transactions at a merchant location using audio communication. The central hub device can also include an audio sensor (e.g., a microphone) and a device capable of producing audio communications (e.g., a speaker). In some examples, the central hub device can, at 702, receive transaction notification data describing a transaction with a user computing device.

In some examples, the transaction notification data is generated by input to the central hub device by a user associated with the merchant. For example, a staff member employed at the merchant can enter information when a transaction is being conducted. For example, if the transaction is an oil change, a staff member can add the oil change transaction to a computing system associated with the merchant that can communicate with the central hub device. In another example, the transaction notification data can be generated during a registration process of a user computing device. In some examples, the registration process is initiated by an audio signal generated by the central hub device. For example, the central hub device can periodically broadcast a registration signal such that user computing devices that enter the area can receive the registration signal, activate an application that corresponds to the service provided via the central hub device.

The central hub device can, at 704, access one or more location determination signals to estimate a location of the user computing device with the merchant location. In some examples, the location determination signals include seating information provided by the staff of the merchant location. For example, the central hub device can store information describing the layout of the merchant location (including table locations if the location is a restaurant). When a new customer is seated, the associated server can note the table at which the customer is seated, and the central hub device can use the table information and the store layout information to determine a direction from the location of the central hub device to the location of the user computing system.

In some examples, the location determination signals can include information derived by determining a distance between the user computing device and the central hub device. The distance between the central hub device and the user computing device can be determined based on the time needed to transmit and receive communications from the user computing device. In some examples, the location determination signals include triangulating the position of the user computing device based on signals received from the user computing device.

In some examples, the central hub device can, at 706, transmit transaction data to the estimated location of the user computing device using audio-based communications, the transaction data including an audio key that, when detected by the user computing device, causes the user computing device to automatically activate an application for providing payment data. In some examples, the audio-based communication signal is generated in the subsonic signal range. The transaction data can have a list of different transactions associated with a particular area of the merchant location. In some examples, the user can select their specific transaction from the lists of transactions.

In some examples, the transaction data can include instructions to generate a notification at the user computing device. For example, the notifications can include audio or visual signals indicating that the transaction is ready to be completed. In some examples, the transaction data includes an audio key. The audio key can be a predetermined audio pattern that, when detected by a user computing device with the transaction application installed, can cause the transaction application to transition into an active mode.

In some examples, the central hub device can include one or more speaker(s) that can direct audio signals in a particular direction. In some examples, each speaker can be oriented in a different direction. The central hub device can select a speaker to engage based on the estimated location of the user computing device.

In some examples, the hub computing device can determine a time at which payment is required as part of the transaction. In some examples, the central hub device can delay the transmission of the transaction data until the time at which payment is required. For example, a specific transaction may include one or more steps in which information is required from the user. For example, if the transaction is the purchase of clothing, the transaction may include receiving a user's size preferences and aesthetic choices as well as confirming a payment account to be used in the transaction.

In some examples, the central hub device determines a transaction initiation time. The transaction initiation time can represent the time at which the transaction was initiated. For example, a transaction can be initiated when a user enters a merchant's location, orders a meal, requests a specific service, or otherwise indicates that they will be performing a transaction.

The central hub device can determine a specific transaction associated with the user computing device. For example, the specific transaction can include a particular order or service (e.g., the specific food ordered by a customer and so on). The central hub device can determine a duration associated with the specific transaction. For example, specific services can have standard times at which particular steps are expected to be performed (e.g., an oil change has an estimated time before payment is required). In some examples, the central hub device can estimate a time at which payment is required based on the duration associated with the specific transaction and the transaction initiation time.

The central hub device can determine a transaction type associated with the transaction. For example, a transaction can be grouped into a general transaction type such as a meal type, a medium-length service, and so on. The central hub device can estimate a total time for the transaction based on the transaction type. For example, each transaction type can have an associated average length of time.

In some examples, the central hub device can, at 708, receive transaction payment data from the user computing device. For example, the user can approve a transaction or select their transaction from a list of possible transactions using the user computing device. In response, the user computing device can transmit transaction payment data to the central hub device. The central hub device can, at 710, execute the transaction by transmitting transaction data to a transaction system. The transaction system can be a payment processing system.

The technology discussed herein makes reference to sensors, servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method of enabling frictionless transactions at a merchant location using audio communication, the method comprising:
    periodically transmitting, by a central hub device comprising one or more processors, a registration signal in the merchant location, wherein the central hub device is connected to a first and second audio sensor located at different positions within the merchant location;
    receiving, by the central hub device, wireless transmission signals from a user computing device, wherein the wireless transmission signals are transmitted automatically by the user computing device in response to receiving the registration signal;
    receiving, by the central hub device, transaction notification data describing a transaction with the user computing device;
    triangulating, by the central hub device, a location of the user computing device within the merchant location based on the received wireless transmission signals, wherein triangulating a location comprises:
        determining a first time at which the first audio sensor at a first location detects the wireless transmission signals;
        determining a second time at which the second audio sensor at a second location detects the wireless transmission signals; and
        calculating, by the central hub device, an estimated location of the user computing device within the merchant location;
    transmitting, by the central hub device, transaction data to the estimated location of the user computing device using audio-based communications, the transaction data including an audio key that, when detected by the user computing device, causes the user computing device to automatically activate an application for providing payment data, wherein automatically activating the application can comprise initiating a notification that a transaction is ready to be completed;

receiving, by the central hub device, transaction payment data from the user computing device; and executing, by the central hub device, the transaction by transmitting transaction data to a payment system.

2. The computer-implemented method of claim 1, wherein transmitting, by the central hub device, transaction data to the estimated location of the user computing device using audio-based communications further comprises:

generating, by the central hub device, an audio signal that includes the transaction data such that the audio signal is focused toward the estimated location of the user computing device.

3. The computer-implemented method of claim 1, wherein triangulating, by the central hub device, a location of the user computing device within the merchant location based on the received wireless transmission signals further comprises:

determining, by the central hub device, a total time to transmit data to the user computing system and receive a response from the user computing system; and estimating, by the central hub device, a distance from the central hub device to the user computing device.

4. The computer-implemented method of claim 1, wherein transaction notification data is generated by input to the central hub device by a user associated with the merchant.

5. The computer-implemented method of claim 1, wherein transaction notification data is generated during a registration process of a user computing device.

6. The computer-implemented method of claim 1, wherein the audio-based communication signal is generated in a subsonic signal range.

7. The computer-implemented method of claim 1, wherein the location determination signals includes seating information provided by a staff member of the merchant location.

8. The computer-implemented method of claim 1, wherein the location determination signals include signals transmitted by the user computing device.

9. The computer-implemented method of claim 1, wherein the transaction data includes a list of potential transactions.

10. The computer-implemented method of claim 9, wherein transaction payment data includes a user selected transaction from the list of potential transactions.

11. The computer-implemented method of claim 1, wherein the transaction data includes an audio key that causes an application on a user computing device to enter an active mode.

12. The computer-implemented method of claim 1, wherein the transaction data includes instructions that cause the user computing device to generate a notification.

13. The computer-implemented method of claim 1, wherein transmitting, by the central hub device, transaction data to the estimated location of the user computing device using audio-based communications further comprises:

determining, by the central hub device, a time at which payment is required as part of the transaction; and delaying, by the central hub device, transmission of the transaction data until the time at which payment is required.

14. The computer-implemented method of claim 13, wherein determining, by the central hub device, a time at which payment is required as part of the transaction comprises:

determining, by the central hub device, a transaction initiation time.

15. The computer-implemented method of claim 14, determining, by the central hub device, a time at which payment is required as part of the transaction comprises:

determining, by the central hub device, a specific transaction associated with the user computing device;

determining, by the central hub device, a duration associated with the specific transaction; and estimating a time at which payment is required based on the duration associated with the specific transaction and the transaction initiation time.

16. The computer-implemented method of claim 14, wherein determining, by the central hub device, a time at which payment is required as part of the transaction comprises:

determining, by the central hub device, a transaction type associated with the transaction; and estimating, by the central hub device, a total time for the transaction based on the transaction type.

17. A system to enable frictionless transactions at a merchant location using audio communication, comprising:

a storage device; and a processor communicatively coupled to the storage device, wherein the processor executes application code instructions that are stored in the storage device to cause the system to:

periodically transmitting a registration signal in the merchant location, wherein a central hub device is connected to a first and second audio sensor located at different positions within the merchant location;

receiving wireless transmission signals from a user computing device, wherein the wireless transmission signals are transmitted automatically by the user computing device in response to receiving the registration signal;

receiving transaction notification data describing a transaction with the user computing device;

triangulating a location of the user computing device within the merchant location based on the received wireless transmission signals, wherein triangulating a location comprises:

determining a first time at which the first audio sensor at a first location detects the wireless transmission signals;

determining a second time at which the second audio sensor at a second location detects the wireless transmission signals; and calculating an estimated location of the user computing device within the merchant location;

transmitting transaction data to the estimated location of the user computing device using audio-based communications, the transaction data including an audio key that, when detected by the user computing device, causes the user computing device to automatically activate an application for providing payment data, wherein automatically activating the application can comprise initiating a notification that a transaction is ready to be completed;

receiving transaction payment data from the user computing device; and executing the transaction by transmitting transaction data to a payment system.

18. A non-transitory computer-readable storage device having computer-readable program instructions embodied therein that when executed by a computing system cause the computing system to perform operations comprising:

periodically transmitting, by a central hub device, a registration signal in a merchant location, wherein the central hub device is connected to a first and second audio sensor located at different positions within the merchant location;

receiving wireless transmission signals from a user computing device, wherein the wireless transmission signals are transmitted automatically by the user computing device in response to receiving the registration signal;

receiving transaction notification data describing a transaction with the user computing device;

triangulating a location of the user computing device within the merchant location based on the received wireless transmission signals, wherein triangulating a location comprises:

determining a first time at which the first audio sensor at a first location detects the wireless transmission signals;

determining a second time at which the second audio sensor at a second location detects the wireless transmission signals; and calculating an estimated location of the user computing device within the merchant location;

transmitting transaction data to the estimated location of the user computing device using audio-based communications, the transaction data including an audio key that, when detected by the user computing device, causes the user computing device to automatically activate an application for providing payment data, wherein automatically activating the application can comprise initiating a notification that a transaction is ready to be completed;

receiving transaction payment data from the user computing device; and executing the transaction by transmitting transaction data to a payment system.

* * * * *